FIG. I.

REFINING RATE OF GLASS BATCHES CONTAINING $Na_2S$-FRIT

REFINING RATE OF GLASS BATCHES CONTAINING BaS-FRIT

United States Patent Office 3,511,629
Patented May 12, 1970

3,511,629
METHOD FOR REFINING GLASS WITH A METAL SULFIDE FRIT
William C. Bauer and Alfred R. Conroy, Jr., Denver, Colo., assignors to FMC Corporation, New York, N.Y., a corporation of Delaware
Filed Dec. 1, 1966, Ser. No. 598,433
Int. Cl. C03b 5/22
U.S. Cl. 65—134                         9 Claims

ABSTRACT OF THE DISCLOSURE

This invention relates to the manufacture of glass and, more specifically, to an improvement in the refining and melting of a glass batch by introduction of a specially prepared frit in the glass batch as a refining and melting aid, whereby the frit added contains a metal sulfide which acts as a refining and melting agent.

BRIEF SUMMARY OF THE INVENTION

Background

Metal sulfides are added to glass furnaces as part of a glass batch in order to help the refining operation (removal of gas inclusions or "seeds" in the glass). However, the metal sulfides are not chemically stable and are readily oxidized in the furnace and easily hydrolyzed on contact with water or moisture. Further, uncontrolled loss of the added metal sulfide occurs in the furnace due to vaporization of the sulfide. In addition, many metal sulfides are toxic and require utmost precautions in handling. Thus, there is a need for a method of adding metal sulfides which would avoid such problems.

The invention

The above problems encountered in adding metal sulfides per se to a glass furnace, such as ready oxidation and hydrolysis of the sulfides, the hazards of handling toxic sulfides, and the uncontrolled vaporization and loss of much of the added sulfides, can be overcome by adding a sulfide-containing frit prepared by dissolving a metal sulfide in a molten glass composition at a temperature no higher than about 2350° F., and in which the preferred glass composition is flint cullet (crushed glass plant product rejects) and the preferred metal sulfide is either sodium sulfide or barium sulfide; upon addition of this frit to the furnace as part of the glass batch, the sulfide in the frit is released in situ and is not subject to thermal breakdown, e.g. oxidation or hydrolysis, or to vaporization in the unmelted frit.

DETAILED DESCRIPTION OF INVENTION

Figure 1:
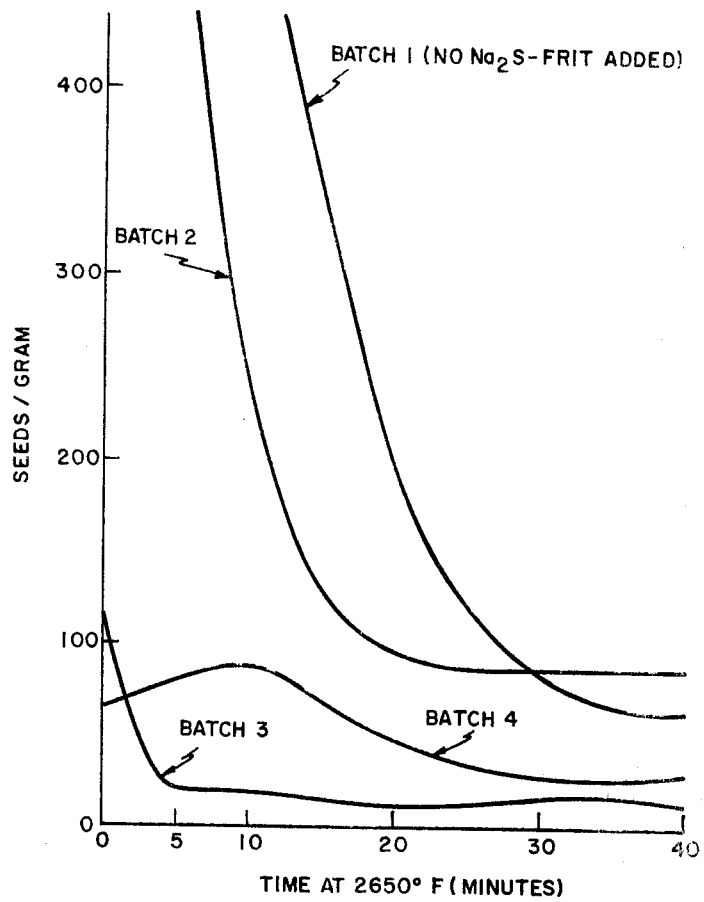
FIG. 1 illustrates a graph showing a series of curves that define the change in the seed content (seeds/gram) of glass compositions containing an $Na_2S$ frit, as a function of refining time.

In the manufacture of glass the principal ingredients, soda, lime and silica are mixed as homogeneously as possible and a batch of this mixture is charged into a furnace and heated until these ingredients melt or fuse into a liquid of high viscosity. During this fusion, chemical reactions take place which result in the evolution of gases and the formation of bubbles in the melt. Most of the gas bubbles rise upwardly in the viscous liquid and escape from the solution. However, some remain and form gas inclusions or "seeds." These "seeds" are undesirable in glass because they are unsightly and are therefore aesthetically unappealing to the ultimate purchaser and, if present in excess, also weaken the glass structure.

In general, the melting operation of a glass furnace is controlled to yield maximum glass tonnages with minimum gas inclusions (seeds) at the lowest practical operating temperatures. It is therefore desirable to reduce or eliminate seeds in glass produced at standard temperatures and at a standard production rate. The technique for reducing the number of seeds in glass is termed "refining" (sometimes also termed "fining") and is carried out by maintaining the glass in a molten state to permit the largest possible number of gas bubbles to rise to the surface of the melt and escape from solution. Various chemicals have been added to glass batches by manufacturers in order to hasten the refining process; these additives are known as "refining agents" and in general lower the seed level in a given glass melt.

Among the refining agents that have been used by prior workers are metal sulfides such as barium sulfide. Other compounds such as the by-product slag from a metallurgical furnace (preferably blast-furnace slag) are also used as refining agents. While the active ingredients of the blast-furnace slag are not known, it is theorized that they may be metallic sulfides.

In spite of the effectiveness of these refining agents, serious problems have arisen in their use. In the case of metal sulfides per se, e.g. sodium sulfide or barium sulfide, they are hazardous to handle because they are toxic. For example, sodium sulfide is known to be a depilatory compound and therefore requires utmost handling precautions. In addition, the added metal sulfides are chemically unstable and are readily subject to oxidation or hydrolysis with concomitant loss of sulfide values. Thus, even where carefully weighed amounts of metal sulfides are added to the glass batch, the effective amount of sodium sulfide which remains in the batch cannot be readily controlled because variable, sizable amounts of sulfide are lost from the batch prior to entering the glass furnace or immediately after entering the furnace.

When blast-furnace slag is used as the refining agent, metallic impurities frequently are present in the slag such as iron or manganese; these produce undesirable coloring effects in flint (clear, white) glass. In addition blast-furnace slag is chemically nonhomogeneous as a function of its grain size. Thus, segregation frequently takes place in the glass plant raw material feeds or in mixed-batch storage bins and results in nonhomogeneous batches being fed to the glass furnace.

It is an object of the present invention to provide a more effective method for adding metal sulfide refining agents to a glass furnace as part of the glass batch.

It is a further object of the present invention to provide a sulfide-containing refining agent in which the metal sulfide content thereof is not subject to ready oxidation, hydrolysis or vaporization.

It is a further object of the present invention to provide a novel refining composition containing a metal sulfide wherein said metal sulfide is liberated in situ within the glass furnace.

These and other objects will be apparent from the following description.

We have now found an improved method for adding a metal sulfide to a glass furnace as part of the glass batch by adding said metal sulfide in the form of a sulfide-containing frit; it is prepared by melting together at a temperature no higher than about 2350° F. a metal sulfide and a glass composition containing as essential ingredients, expressed as oxides, $SiO_2$, CaO and $Na_2O$, until a substantially homogeneous melt is obtained containing the metal sulfide, and subsequently cooling the resulting melt to form a glass frit containing as an essential element, said metal sulfide, whereby said metal sulfide is stabilized against oxidation, hydrolysis and vaporization.

In carrying out the present invention a glass composition containing sufficient amounts of soda (sodium carbonate), lime (calcium oxide) or limestone (calcium carbonate), and silica ($SiO_2$), in proportions well known in the art to produce either flint (clear, white) or green container, or plate glass, is mixed together with sufficient amounts of a metal sulfide to form a homogeneous mixture containing (by theory) up to about 15% by weight of the metal sulfide. The glass mixture is then heated until it is melted and the metal sulfide uniformly dispersed or dissolved throughout the melt. The exact temperature required to effect dissolution or dispersion of the metal sulfide in the glass composition to form a uniform mixture will depend on the particular glass composition utilized and on the melting temperature of the metal sulfide which is used. In general, melting can commence as low as about 1900° F. and can be carried out for periods up to a few hours. The melt should not be heated above about 2350° F. nor should excessive melting times be employed, because excessive amounts of the sulfide vaporize from the melt or are oxidized, and are lost.

The metal sulfides which are preferred are the alkali metal sulfides, such as sodium sulfide and potassium sulfide, and the alkaline earth metal sulfides, such as strontium sulfide and barium sulfide. One alkaline earth metal sulfide which has been found difficult to use in the practice of the present invention is calcium sulfide. This is because calcium sulfide forms a liquid phase with molten glass only at extremely high temperatures (2600° F. or above), and the sulfide readily vaporizes from the melt during preparation of the frit.

After the metal sulfide has been completely dissolved or dispersed in the melt, the melt is poured into cold water to cool and is granulated into a final frit. The amount of metal sulfide which is contained in the final frit will depend upon the melting temperature used in preparing the frit and the amount of time the melt is held in a molten condition. Higher temperatures increase the volatilization or oxidation rate of the metal sulfide and increase losses. Prolonged melting times also increase sulfide losses because the metal sulfide vaporizes or oxidizes even after it has been dissolved in the glass melt.

In the preferred embodiment of the present invention, glass cullet (crushed glass plant product rejects) is used in place of a mixture of glass-forming ingredients per se. Cullet is preferred as the base material in making up the present sulfide-containing frit because the cullet melts at a sufficiently low temperature and at a rapid rate to permit high sulfide-containing frits to be made up. A high sulfide-containing frit is more easily produced when the metal sulfide dissolves in the cullet at relatively low temperatures and within relatively short periods of time because it reduces the tendency of the sulfide to volatilize. It will be obvious to those skilled in the art that the composition of the cullet used to prepare the frit must be compatible with the composition of the final glass product.

In the make up of the frit, as much as 50% or more of the sulfide values may be lost due to vaporization. The resulting sulfide-containing frit may contain anywhere from about 3 up to about 10% by weight of metal sulfide, expressed as sulfide sulfur. Within this range the sulfide content which remains in the frit is extremely resistant to chemical change by either oxidation or hydrolysis. For example, frits exposed to air for two weeks show no evidence of oxidation. Also frits which are placed in cold water lose less than 1% of their weight after ten days. Frits can be made which contain larger sulfide content but they are much less stable. The preferred metal sulfides are sodium sulfide and barium sulfide because these can be readily incorporated in a frit at low temperatures and for shorter melting periods.

In the process of using the present sulfide-containing frit, a glass batch containing sufficient amounts of soda (sodium carbonate), lime (calcium oxide) or limestone (calcium carbonate) and silica ($SiO_2$) and other components, e.g. feldspar, dolomite, sodium sulfate, etc. in proportions well known in the art to produce flint (clear, white) or green container, or plate glass is mixed with the required amount of frit until a homogeneous mixture has been obtained. The frit is added to the glass batch in amounts sufficient to supply at least 0.003% by weight of sulfide sulfur. The preferred amounts are 0.003 to 0.033% by weight of sulfide sulfur. This amounts to about 0.1 to about 1.0 pounds of added sulfide sulfur per ton of sand in the mix. The homogeneous glass batch, including the added frit, is then placed in a glass furnace and heated at a temperature in the range of 2400–2900° F. until the batch is fully melted and refined. Thereafter the molten glass is cooled and formed in a desired form or mold in conventional fashion.

Larger amounts of sulfide sulfur, above 0.033%, may be added to the glass batch and will still be effective as a refining and melting additive. However, in certain glasses, notably flint glasses, the use of larger amounts of sulfide is not recommended because changes in glass color occur at the higher concentrations of sulfide. However, if these slight changes in color are not material to the final product, or if the glass is intentionally colored such as green container glass, then additional amounts of sulfide can be used without detrimental effects.

It is also preferred to add sodium sulfate along with the sulfide-containing frit because the sulfate in combination with the sulfide is more effective as a melting and refining aid than is the metal sulfide alone. In general, the sodium sulfate is added preferably in amounts of about 20 pounds per ton of sand used in the formation of the glass.

In normal melting of glass batches, when the temperature of the batch reaches about 1560° F., silica reacts with soda ash in the mix to form a solid, sodium metasilicate composition. As the temperature is increased to 1900–2000° F. this solid, metasilicate composition begins to melt and forms a viscous liquid. The molten sodium metasilicate then commences to dissolve the remaining silica, lime and aluminous components with increases in temperatures until all of these components have been dissolved. Normally silica is the last component in the mix to be completely dissolved.

In the instant invention the sulfide-containing frit, which is introduced into the glass furnace along with the glass batch, commences to melt at temperatures of around 1700° F. When this occurs the dissolved metal sulfide is released in situ within the molten glass melt to aid in the refining and melting process. The in situ released metal sulfide commences to react with molten sodium metasilicate and sodium sulfate, if present, just above the metasilicate melting point (about 1990° F.). This reaction releases considerable quantities of $SO_2$ gas thus initiating the refining process at an abnormally low temperature and further enhancing the process by helping to eliminate other undesired gases such as carbon dioxide which are present in the melt. The $SO_2$ gases create a stirring or agitation of the melt which helps expel undesired gas bubbles therein.

As the temperature of the melt increases to about 2400° F. a very sharp decrease in the apparent surface tension and viscosity occurs. This results in a rapid increase in the dissolution of the undissolved silica grains and ultimately results in increasing the rate of dissolution of the glass batch. While a metal sulfide such as sodium sulfide is effective as a refining aid, as explained above, the use of sodium sulfide in connection with sodium sulfate is preferred in the present invention since this combination is extremely effective as both a refining aid and a melting aid.

While there is no intent to be bound by any explanation or theory of operation of this preferred mode of the invention, it is believed that the in situ released metal sulfide, i.e. sodium sulfide and sodium sulfate which is present in the batch operate as follows. When the melt is heated in the furnace the first reaction which occurs is between the sodium carbonate and the silica sand; this commences with the melting of soda ash at approximately 1560° F. This reaction produces sodium metasilicate, which remains in a solid state (melting point about 1990° F.). The sodium metasilicate cannot begin its important function of dissolving unreacted silica until the melt reaches a temperature of about 1990° F. at which temperature the sodium metasilicate composition melts. However, at temperataures commencing at approximately 1700° F., the temperature at which the sulfide-containing frit melts and in situ sodium sulfide is released, sodium sulfide and sodium sulfate react to form sodium oxide and sulfur dioxide in accordance with the following equation:

$$3Na_2SO_4 + Na_2S \rightarrow 4Na_2O + 4SO_2$$

By the time the temperature of the batch has reached 1990° F., the above chemical reaction of the sodium sulfate and sodium sulfide is well along and in some manner causes a sharp drop in the apparent surface tension and viscosity of that portion of the batch that has melted. As a result, mass transfer reactions in this highly fluid melt proceed at much greater rates than normally would occur and result in rapid dissolution of undissolved silica grains (sand).

In addition to the increase in fluidity of the melt caused by the above reaction, the $SO_2$ which is released at these relatively low temperatures aids in mixing and agitating the liquid phase. Further, the presence of $SO_2$ in the melt at the relatively low temperatures of 1900–1990° F. initiates removal of other bubble-producing gases from the melt much sooner than is normally the case. The $SO_2$ gas aids in expelling these gases in part by aiding the formation and rise of the bubbles to the surface of the melt and in part by agitating the melt and facilitating movement of the bubbles to the melt surface.

The use of sodium sulfate as a melting aid is also desirable because of its effect at temperatures above about 2000° F. More explicitly, the sodium sulfate per se melts at approximately 1620° F. and completely dissolves in the molten sodium metasilicate when the temperature of the melt reaches about 2000° F. and above. The sodium sulfate does not commence its refining and melting aid function until after the molten sodium metasilicate (which melts at 1990° F.) has dissolved a quantity of silica sufficient to render the sodium sulfate insoluble therein. Thereafter, the insoluble sodium sulfate separates from the melt and forms an immiscible liquid phase which acts as a surfactant in the melt, seeking out and adhering to all surfaces, including solid grains, gas bubbles, etc. The surfactant effect causes a high fluidity at the interfaces of the solid grains and gas bubbles and thereby increases dissolution of the solid particles and speeds up the rise of the bubbles through the melt. In effect, it greases the bubbles and allows them to rise to the surface more rapidly and be expelled from the melt. At higher temperatures, on the order of about 2350° F., the immiscible sodium sulfate fluid begins to decompose and the decomposition products further aid in the refining process.

The invention will now be illustrated by detail reference to the following drawings. In the drawings:

FIG. 1 illustrates a graph showing a series of curves that define the change in seed content (seeds/gram) of glass compositions, containing an $Na_2S$-containing frit, as a function of refining time. The glass compositions were refined at 2650° F. for the amounts of time specified in the abscissa axis of FIG. 1. The compositions were made up and refined by the process set forth in Example 1.

Figure 2:
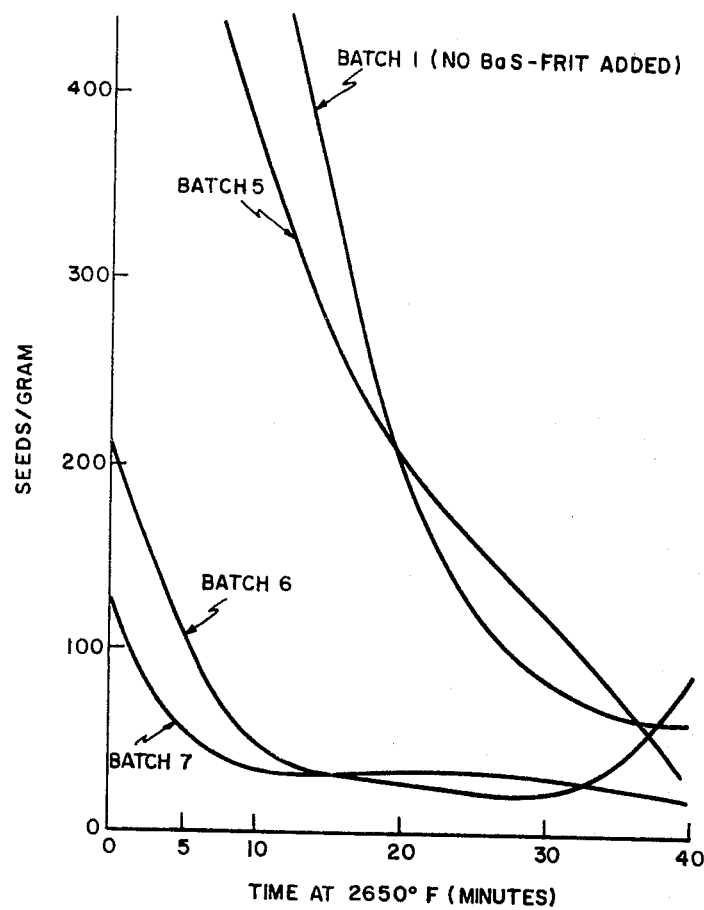
FIG. 2 illustrates a graph like FIG. 1, except that a BaS frit was used in these compositions.

FIG. 2 illustrates a series of curves, like FIG. 1, that show the seed count of varying glass compositions as a function of refining time, except that a BaS-containing frit was added to these compositions. The procedure used in making up and refining these glass batches is set forth in Example 2.

The following examples are given to illustrate the present invention and are not deemed to be limiting thereof.

EXAMPLE 1.— PREPARATION OF $Na_2S$-CONTAINING FRIT

Sodium sulfide-containing frits were made up as follows:

Flint cullet containing, as principal ingredients, about 71.5 weight percent $SiO_2$, about 13.0 weight percent CaO and about 15.5 weight percent $Na_2O$ was crushed and mixed with sodium sulfide. The sodium sulfide was commercial flake $Na_2S \cdot 9H_2O$ 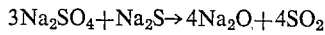 which was first dehydrated by heating to remove all water of hydration. A number of 100 gram samples containing varying amounts of $Na_2S$ were placed in fire clay crucibles and heated in a laboratory electric furnace. When the temperature reached 1600° F., a first liquid phase began to appear. At 1800° F. the last of the solids dissolved. The melt was maintained for a total of 1.5 hours at 2200° F. to assure uniform dissolving of the sodium sulfide. Thereafter, the melt was poured into cold water to cool and granulated into the $Na_2S$-containing frit. The amount of sodium sulfide added to the initial glass batch and the amount of sulfide which remained in the final frit is set forth in Table 1. The water reactivity of the frit was then determined by soaking the frit in water and determining the percent weight loss. The water reactivity and the physical properties of the frit are also reported in Table 1.

Run B.—Preparation of a glass batch without $Na_2S$-containing frit

A glass batch was prepared containing 58.97% silica sand, 19.09% calcite limestone, 21.28% soda ash and 0.60% salt cake ($Na_2SO_4$). To this batch was added a sodium sulfide frit containing 4.66% sulfide sulfur in amounts corresponding to 0.1 pound of sulfide sulfur per ton of sand used in the glass batch formulation. The refining rate of this glass batch was determined by melting 75 gram samples thereof in fire clay crucibles at 2650° F. under an air atmosphere in an electric muffle furnace. Separate batch samples were placed in the muffle furnace at 2650° F. and held at this temperature for periods of 5, 10, 20, 30, and 40 minutes over and above the furnace recovery time; approximately 30 minutes were required for the furnace to recover to 2650° F. after a sample was introduced. After a sample had been held at 2650° F. for the required period of time, it was removed and a glass button about 32 mm. in diameter and 10 mm. thick was poured from the melt. The glass button was annealed, cooled and weighed and the total number of bubbles (seeds) were counted under a low power microscope. The refining rate is reported in FIG. 1 in terms of seeds per gram plotted against retention time, in minutes, at 2650° F. The composition of the batch as well as the final glass is set forth in Table 2 as batch number 2.

Two other runs were made using slightly different glass batches and containing larger quantities of sodium sulfide frit. The compositions of these batches and the final glass compositions are given in Table 2 as batches 3 and 4. The refining rates of batches 3 and 4 are also given along with batch 2 in FIG. 1 of the drawings.

Run B.—Preparation of a glass batch without Na₂S-containing frit

The process of Run A was repeated using a similar glass batch except that no sodium sulfide frit was used in the make up of the batch. The resulting batch was melted and refined in exactly the same fashion as set forth in Run A. The composition of the glass batch and the composition of the final glass product are set forth in Table 2 as batch 1. The refining rate of batch 1 is also set forth in FIG. 1 and FIG. 2 of the drawings.

Preparation of glass batch containing a BaS-containing frit

A glass batch was prepared containing 58.97% silica sand, 19.08% calcite limestone, 21.24% soda ash and 0.60% salt cake ($Na_2SO_4$). To this batch was added a barium sulfide frit, containing 5.00% sulfide sulfur, in amounts corresponding to 0.1 pound of sulfide sulfur per ton of sand used in the glass batch formulation. The refining rate of this glass batch was determined by melting 75 gram samples thereof in fire clay crucibles at 2650° F. under an air atmosphere in an electric muffle furnace. The batch samples were placed in the muffle furnace at 2650° F. and held at this temperature for periods of 5, 10, 20, 30 and 40 minutes over and above the furnace recovery time; approximately 30 minutes was required for the furnace to recover to 2650° F. after a sample was introduced. After a sample had been held at 2650° F. for the required period of time, it was removed and a glass button about 32 mm. in diameter and 10 mm. thick was poured from the melt. The glass button was annealed, cooled and weighed and the total number of bubbles (seeds) were counted under a low power microscope. The refining rate is reported in FIG. 2 in terms of seeds per gram plotted against retention time, in minutes, at 2650° F. The composition of the batch as well as the final glass is set forth in Table 4 as batch number 5.

Two other runs were made using slightly different glass batches and containing larger quantities of barium sulfide frit. The composition of these batches and the final glass product is given in Table 4 as batches 6 and 7. The refining rates of the batches 6 and 7 are also given along with batch 5 in FIG. 2 of the drawings.

For purposes of comparison, FIG. 2 also contains the refining rate of a batch (batch number 1) in which no sulfide frit was added. This batch was prepared as set forth in Example 1, Run B.

TABLE 1

| Metal sulfide | Theoretical, percent S⁻ in frit | Actual percent S⁻ in frit | Percent loss of S⁻ in frit preparation | H₂O Reactivity | | Physical properties of frit |
|---|---|---|---|---|---|---|
| | | | | Soak time | Wt. loss, percent | |
| Na₂S | 10.0 | 4.28 | 57.2 | 10 days | 0.76 | Homogeneous, red, opaque glass. |
| Na₂S | 5.51 | 3.78 | 31.4 | 71 hrs | 0.08 | Homogeneous, dark brown, opaque glass. |
| Na₂S | 8.27 | 4.66 | 43.7 | 71 hrs | 0.28 | Homogeneous, red-black, opaque glass |
| Na₂S | 11.02 | 3.87 | 64.9 | 71 hrs | 2.66 | Red-brown, opaque, dull glass. |

TABLE 2

| | Weight percent | | | |
|---|---|---|---|---|
| Batch No | 1 | 2 | 3 | 4 |
| Batch raw materials: | | | | |
| Silica sand | 59.00 | 58.97 | 58.91 | 58.81 |
| Calcite limestone | 19.10 | 19.09 | 19.07 | 19.04 |
| Soda ash | 21.30 | 21.28 | 21.24 | 21.17 |
| Salt cake | 0.60 | 0.60 | 0.60 | 0.60 |
| Na₂S frit (4.66% S⁻) | None | 0.06 | 0.19 | 0.38 |
| S⁻ lbs./ton sand | None | 0.1 | 0.3 | 0.6 |
| Resulting glass analysis: | | | | |
| SiO₂ | 71.29 | 71.29 | 71.28 | 71.28 |
| CaO | 12.93 | 12.93 | 12.93 | 12.93 |
| Na₂O | 15.37 | 15.37 | 15.37 | 15.37 |
| SO₄ reported as SO₃ | 0.41 | 0.41 | 0.41 | 0.41 |
| S⁻ | None | 0.003 | 0.011 | 0.021 |

EXAMPLE 2.—PREPARATION OF BaS-CONTAINING FRITS

Barium sulfide-containing frits were made up as follows: Flint cullet containing, as essential ingredients, about 71.5 weight percent $SiO_2$, about 13.0 weight percent CaO and about 15.5 weight percent $Na_2O$ was crushed and mixed with barium sulfide powder. The barium sulfide was supplied in the form of "black ash" (a crude commercial BaS product) which did not require any pre-treatment before being added to the crushed cullet. A number of 100 gram samples containing varying amounts of barium sulfide were placed in fire clay crucibles and heated in a laboratory electric furnace. When the temperature reached about 1600° F. a first liquid phase began to appear. At 2300° F. the last of the solids dissolved. The melt was maintained for a total of 1.5 hours at 2350° F. to assure uniform dissolving of the barium sulfide. Thereafter, the melt was poured into cold water to cool and granulated into the BaS-containing frit. The amount of barium sulfide added to the initial glass batch and the amount of sulfide which remained in the final frit is set forth in Table 3. The water reactivity of the frit was then determined by soaking the frit in water and determining the percent weight loss. The water reactivity and the physical properties of the frit are also found in Table 3.

TABLE 3

| Metal sulfide | Theoretical, percent S⁻ in frit | Actual percent S⁻ in frit | Percent loss of S⁻ in frit preparation | H²O Reactivity | | Physical properties of frit |
|---|---|---|---|---|---|---|
| | | | | Soak time | Wt. loss, percent | |
| BaS | 5.0 | 9.13 | 37.4 | 10 days | 0.94 | Homogeneous, black, opaque glass. |
| BaS | 5.0 | 4.88 | 2.4 | 89 hrs | 0.21 | Do. |
| BaS | 7.5 | 4.83 | 35.6 | 89 hrs | 8.11 | Homogeneous, red-brown and opaque. |
| BaS | 10.0 | 8.39 | 16.1 | 89 hrs | 24.08 | Grey-brown, opaque and very dull. |
| BaS | 5.0 | 5.0 | 0.0 | | | Homogeneous, black, opaque glass. |

TABLE 4

| | Weight percent | | |
|---|---|---|---|
| Batch No | 5 | 6 | 7 |
| Batch raw materials: | | | |
| Silica sand | 58.97 | 58.94 | 58.88 |
| Calcite limestone | 19.08 | 19.01 | 18.92 |
| Soda ash | 21.24 | 21.28 | 21.29 |
| Salt cake | 0.60 | 0.60 | 0.60 |
| BaS frit (5.00% S⁻) | 0.06 | 0.18 | 0.35 |
| S⁻ as lb./ton sand | 0.1 | 0.3 | 0.6 |
| Resulting glass analysis: | | | |
| SiO₂ | 71.28 | 71.28 | 71.28 |
| CaO | 12.92 | 12.88 | 12.82 |
| BaO | 0.02 | 0.05 | 0.10 |
| Na₂O | 15.37 | 15.37 | 15.37 |
| SO₄ reported as SO₃ | 0.41 | 0.41 | 0.41 |
| S⁻ | 0.003 | 0.011 | 0.021 |

The sulfide-containing frit of the present invention, in addition to not being toxic and not susceptible to sulfide losses due to oxidation or hydrolysis, is substantially homogeneous with respect to its sulfide content. As a result when the frit is uniformly distributed throughout the glass batch, the sulfide content is uniform and permits homogeneous batches to be fed to the glass furnace. Also, the present sulfide-containing frit makes it possible to reduce the number and types of impurities which are added to the glass batch as part of the sulfide-containing frit. Further, the use of a sulfide-containing frit permits accurate control of the amount of sulfide which is released in situ in the melted portion of the glass batch.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of melting and refining a glass batch containing glass-forming ingredients to form a final glass product wherein said batch is heated and melted at temperatures of from about 2400° to about 2900° F. and wherein a metal sulfide is added to said batch as a refining agent, the improvement which comprises adding said sulfide to said batch in the form of a sulfide-containing frit prepared by mixing together, at a temperature no higher than about 2350° F., said sulfide and a glass composition consisting essentially of, expressed as oxides, $SiO_2$, CaO and $Na_2O$, and subsequently cooling the resulting melt to form a glass frit containing said sulfide as an essential element in the amount of at least 3% by weight, whereby said sulfide is stabilized against oxidation and hydrolysis.

2. Process of claim 1 wherein said final glass product is selected from the group consisting of flint container, green container and plate, soda-lime glasses.

3. Process of claim 2 wherein the frit contains from about 3 to about 10% by weight of said sulfide expressed as sulfide sulfur.

4. Process of claim 2 wherein said sulfide-containing frit is added in amounts sufficient to supply from about 0.003% to about 0.033% by weight of the sulfide sulfur.

5. Process of claim 2 wherein said sulfide is a member selected from the group consisting of alkali metal sulfides and alkaline earth metal sulfides.

6. Process of claim 2 wherein said sulfide is sodium sulfide.

7. Process of claim 2 wherein said sulfide is barium sulfide.

8. Process of claim 2 wherein said glass batch contains about 20 pounds of sodium sulfate per ton of sand used in the glass composition.

9. Process of claim 1 wherein said glass composition is prepared by melting cullet.

References Cited

UNITED STATES PATENTS

| | | | |
|---|---|---|---|
| 3,133,820 | 5/1964 | Powell | 106—51 |
| 3,150,991 | 9/1964 | Monks | 65—136 XR |
| 3,375,095 | 3/1968 | Poole | 65—134 |
| Re. 26,328 | 1/1968 | Monks | 106—51 |

FOREIGN PATENTS

| | | |
|---|---|---|
| 662,240 | 3/1960 | Canada. |
| 796,364 | 3/1966 | Canada. |

S. LEON BASHORE, Primary Examiner

J. H. HARMAN, Assistant Examiner

U.S. Cl. X.R.

65—136; 106—52

UNITED STATES PATENT OFFICE
CERTIFICATE OF CORRECTION

Patent No. 3,511,629              Dated May 12, 1970

Inventor(s) William C. Bauer and Alfred R. Conroy, Jr.

It is certified that error appears in the above-identified patent and that said Letters Patent are hereby corrected as shown below:

Column 6, lines 42 and 43, "Run B - Preparation of a glass batch without $Na_2S$-containing frit" should read --Run A - Preparation of glass batch containing an $Na_2S$-containing frit--.

Table 3, under Actual percent $S^=$ in frit, line 1, "9.13" should read --3.13--.

Column 8, Table 4, under 7, "21.29" should read --21.26--;

Column 8, Table 4, under 7, "0.06" should read --0.60--.

Signed and sealed this 15th day of February 1972.

(SEAL)
Attest:

EDWARD M. FLETCHER, JR.          ROBERT GOTTSCHALK
Attesting Officer                Commissioner of Patents